US008619396B2

(12) United States Patent
West

(10) Patent No.: US 8,619,396 B2
(45) Date of Patent: Dec. 31, 2013

(54) RENEWABLE ONE-TIME LOAD BREAK CONTACTOR

(75) Inventor: Richard Travis West, Ragged Point, CA (US)

(73) Assignee: Renewable Power Conversion, Inc., San Luis Obispo, CA (US)

( * ) Notice: Subject to any disclaimer, the term of this patent is extended or adjusted under 35 U.S.C. 154(b) by 0 days.

(21) Appl. No.: 13/167,936

(22) Filed: Jun. 24, 2011

(65) Prior Publication Data

US 2012/0133477 A1 May 31, 2012

(51) Int. Cl.
*H02H 3/00* (2006.01)

(52) U.S. Cl.
USPC ........ 361/3

(58) Field of Classification Search
USPC ........ 361/3
See application file for complete search history.

(56) References Cited

U.S. PATENT DOCUMENTS

| | | | | |
|---|---|---|---|---|
| 3,728,583 | A * | 4/1973 | Wickson | 361/102 |
| 4,025,820 | A | 5/1977 | Penrod | |
| 4,249,223 | A | 2/1981 | Shuey et al. | |
| 4,420,784 | A | 12/1983 | Chen et al. | |
| 4,618,906 | A | 10/1986 | Paice et al. | |
| 4,658,320 | A | 4/1987 | Hongel | |
| 5,548,461 | A | 8/1996 | James | |
| 6,128,168 | A | 10/2000 | Arnold et al. | |
| 6,201,678 | B1 * | 3/2001 | Kolbas et al. | 361/93.5 |
| 6,292,337 | B1 | 9/2001 | Legatti et al. | |
| 6,294,767 | B1 * | 9/2001 | Sargeant et al. | 219/519 |
| 6,791,809 | B2 * | 9/2004 | Pannwitz | 361/90 |
| 7,079,363 | B2 | 7/2006 | Chung | |
| 7,259,945 | B2 | 8/2007 | Cleveland | |
| 7,385,791 | B2 | 6/2008 | Ness | |
| 7,593,198 | B2 * | 9/2009 | Brereton et al. | 361/8 |
| 7,630,185 | B2 | 12/2009 | Fiesoli et al. | |
| 7,813,090 | B2 | 10/2010 | Suzuki et al. | |
| 2004/0027734 | A1 | 2/2004 | Fairfax et al. | |
| 2009/0040667 | A1 | 2/2009 | DiSalvo et al. | |
| 2009/0097172 | A1 * | 4/2009 | Bremicker et al. | 361/8 |
| 2009/0147417 | A1 * | 6/2009 | Goodsell et al. | 361/42 |
| 2010/0232082 | A1 | 9/2010 | Seger | |

FOREIGN PATENT DOCUMENTS

| | | | |
|---|---|---|---|
| EP | 0 660 352 | A1 | 6/1995 |
| EP | 0 810 618 | A1 | 12/1997 |
| WO | WO 2007/011692 | A1 | 1/2007 |
| WO | WO 2010/059427 | A2 | 5/2010 |

* cited by examiner

*Primary Examiner* — Rexford Barnie
*Assistant Examiner* — Ann Hoang

(57) ABSTRACT

An electrical contactor with high DC and AC interrupt capability is disclosed. The invention is intended for applications where load break capability is only required under abnormal operating conditions. Under overload conditions, an alternate path is automatically provided through a sacrificial fuse to divert current from opening, or open and arcing, contacts such that the fuse interrupts the fault current and not the contacts. The current rating of the sacrificial fuse may be orders of magnitude less than the normal carry current of the contactor. The contactor provides a one-time load break function that is renewable by the replacement of a fuse.

2 Claims, 5 Drawing Sheets

RENEWABLE ONE-TIME LOAD BREAK CONTACTOR

BACKGROUND OF THE INVENTION

The invention enables applications to be served in a cost effective manner where load break capability of electrical contacts is infrequently required. Prior art solutions use hermetically sealed vacuum contacts, arc shoots, magnetic blowouts, blowout coils, hybrid semiconductor assisted switching, multiple series contact sets and other brute force over-design methods to handle infrequent, worst case fault conditions at the expense of wasting this capability under normal operating conditions.

BRIEF SUMMARY OF THE INVENTION

The invention is an electrical contactor with high DC and AC interrupt capability and is intended for applications where load break capability is only required under abnormal operating conditions. Under overload conditions, an alternate path is automatically provided through a sacrificial fuse to divert current from opening, or open and arcing, contacts such that the fuse interrupts the fault current and not the contacts. The current rating of the sacrificial fuse may be orders of magnitude less than the normal carry current of the contactor. The contactor provides a one-time load break function that is renewable by the replacement of a fuse.

The invention leverages the superior cost effective fault clearing capability of fuses in DC and medium voltage AC applications compared to electrical contacts in ambient air and the ability of low voltage AC rated contacts to withstand contact arcing for infrequent, sub-second periods.

UTILITY OF THE INVENTION

The primary utility of the invention is in utility-scale solar photovoltaic power conversion systems as a DC load break contactor between the photovoltaic array and the DC-to-AC power converter. In this application, the load break capability of the contactor may never be used in the 25-year life of the system but is required to meet safety requirements for improbable worst case fault scenarios. Under normal operation conditions, a DC contactor used in this way will never make or break load current because the DC-to-AC converter load is controllable and interlocked with the DC contactor transitions.

There is a trend toward higher DC voltages in the solar photovoltaic industry. Higher voltages provide inherent cost benefits and system power conversion efficiencies up to a point where the added cost of higher voltage switchgear, fuses and wiring offset these gains. One of the barriers to higher voltage operation is the unavailability of cost effective DC contactors and switchgear. The invention provides an extremely cost effective solution and with improved performance, reliability and safety in any equipment with DC load break capability.

DETAILED DESCRIPTION OF THE INVENTION

FIGS. 1 through 4 illustrate the background operational theory of the invention as well as circuit topology variants. FIG. 5 is a preferred embodiment of the invention.

Figure 1A:
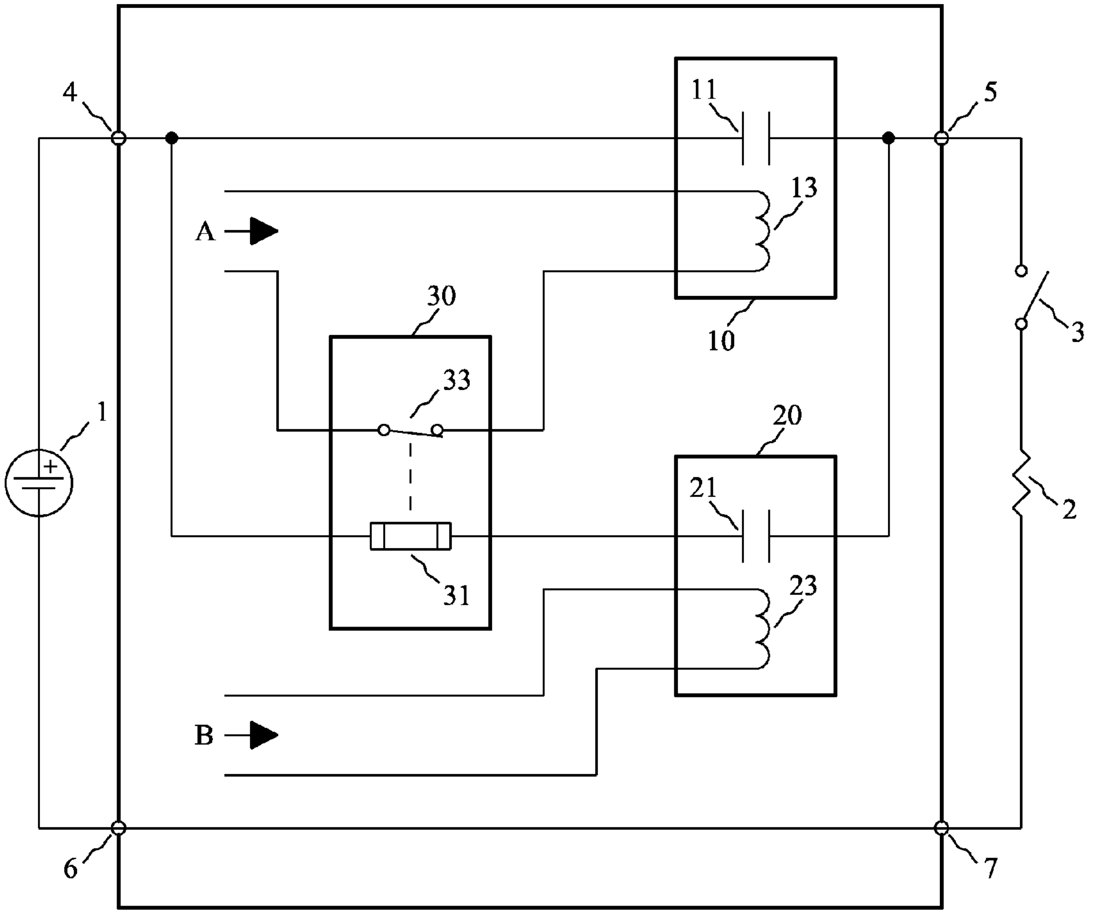
FIG. 1 is a schematic diagram illustrating the most basic functional form of the invention.

FIG. 1A describes a basic form of the invention. Contactors 10 and 20 are electromechanical with normally open contacts 11 and 21 respectively and with actuator coils 13 and 23 respectively. Fuse assembly 30 comprises fuse 31 and indicator switch 33. Indicator switch 33 opens when fuse 31 is cleared. DC source 1 is connected across apparatus terminals 4 and 6. Load 2 and external switch 3 are connected in series across apparatus terminals 5 and 7. The configuration shown in FIG. 1A is bi-directional with respect to current flow so load terminals and source terminals are interchangeable. Source 1 could also be an AC source.

In FIG. 1A, under normal initial conditions where switch 33 closed and switch 3 may be either open or closed, a normal "make" operation of the apparatus is accomplished by providing drive A as shown to close contacts 11. The "make" operation is not possible if fuse 31 and therefore switch 33 are open switch because drive A does not reach coil 13.

In FIG. 1A, to perform a normal "break" operation of the apparatus, external switch 3 must be open. Drive A is first removed and after a short, sub-second delay, drive B is provided to close contacts 21 for a short period. Under normal operating conditions, this timed closure of contacts 21 has no effect. If, however, a fault condition exists where, switch 3 is in a closed condition during the "break" operation, then when drive A is removed, an arc is formed across contacts 11, for a sub-second interval, until contacts 21 are closed to shunt the arc current around contacts 11 to intentionally clear fuse 31. Fuse 31 with superior, cost-effective interrupt capability is used to finally interrupt the fault current, not contacts 11. If the fault current is not great enough to clear fuse 31, contacts 21 are capable of breaking currents less than the minimum interruptible current of the fuse. Fuse 31 performs the dual function of interrupting high fault currents and at lower currents preventing contacts 21 from breaking loads at currents greater than the fuse 31 rating.

In FIG. 1A, indicator switch 33 could be a simple mechanical switch as shown or any other method of detecting the status of the fuse, intact or blown, and any other method of preventing the closure of contacts 11 when fuse 31 is blown.

In FIG. 1A, contactor 20 could be a relay, a semiconductor device, a hybrid device or any other device capable of selectively creating a current path through fuse 31. If a semiconductor device is used in lieu of contactor 20, the circuit begins to "look" like a prior art electromechanical-semiconductor hybrid switch except that the function of the semiconductor switch is very much different; with the invention, the semiconductor device is not required to break the full rated "carry" current through contacts 11, only currents orders of magnitude less, as limited by fuse 31. In other words, the intended high current load break function is performed by the fuse with the invention and by the semiconductor with prior art solutions.

Figure 1B:
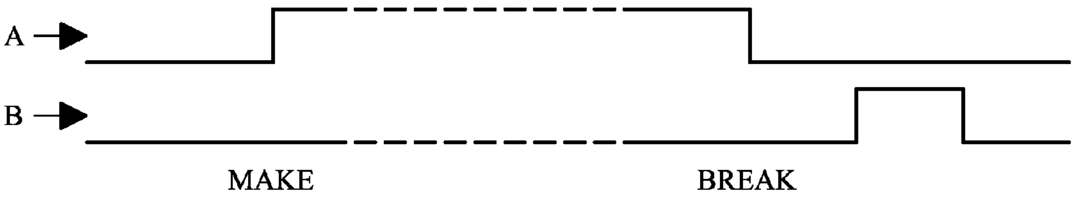

FIG. 1B illustrates the timing if drive signals A and B.

To quantify the value of the invention, a contactor apparatus rated for 1000 A at 1000 Vdc with a 20,000 Adc fault interrupt capability could be configured from a 1000 A AC rated contactor, a 1 A/1000 Vdc rated fuse and a 2 A/1000 Vdc load break rated contactor. The low cost 1 A fuse provides 20,000 A of interrupt capability. This one-time fault interrupting capability is renewable with fuse replacement.

Figure 2A:
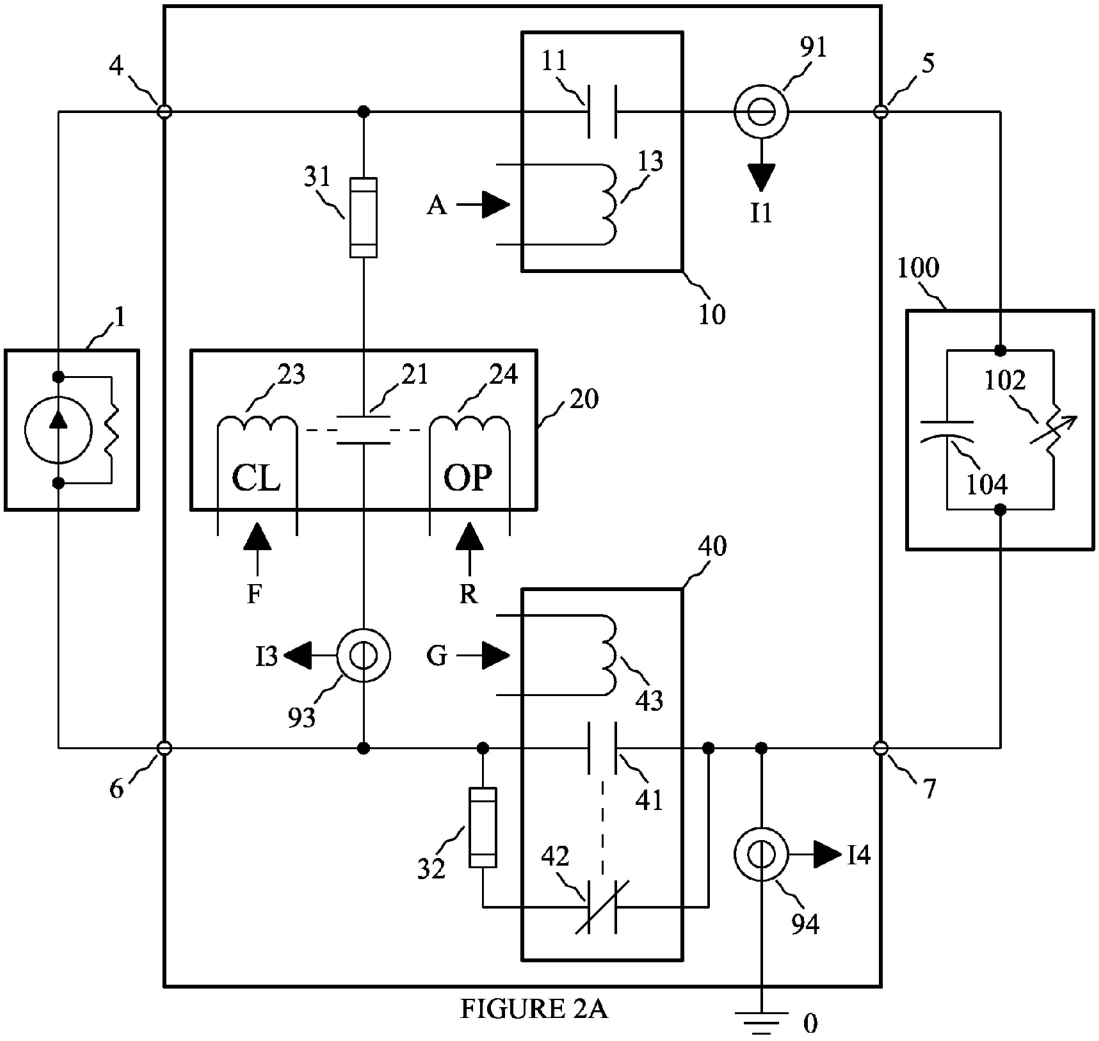
FIG. 2 is a schematic diagram illustrating a circuit topology based on the invention, which is intended for application in a photovoltaic power system.

FIG. 2A illustrates an alternate circuit topology and a more specific application for the contactor apparatus. Source 1 is a solar photovoltaic source (modeled as an imperfect current source) and is connected across apparatus input terminals 4 and 6. Block 100 is an equivalent circuit for a DC-to-AC photovoltaic inverter, as seen by the apparatus, and is connected across apparatus output terminals 5 and 7. The value of load 102 can be adjusted from open circuit to a rated minimum value by the inverter system controller. Capacitor 104 is the DC buss capacitance of the inverter. Contactor 10 is electromagnetic with normally open contacts 11 and actuator coil 13 driven by external drive signal A. Contactor 40 is electromagnetic with normally open contacts 41, normally closed contacts 42 and actuator coil 43 driven by external drive signal G. Contactor 20 is an electromechanical latching type with contacts 21. Drive F (fault) powers coil 23 and triggers the closed state for contacts 21. Drive R (reset) powers coil 24 and triggers the open state for contacts 21. Current sensor 91 provides signal I1 proportional to the current through block 100. Current sensor 93 provides signal I3 proportional to the current through contacts 21. Current sensor 94 provides signal I4 proportional to the ground fault current from source 1 to earth ground 0. Ground 0 is the photovoltaic system earth ground.

Figure 2B:
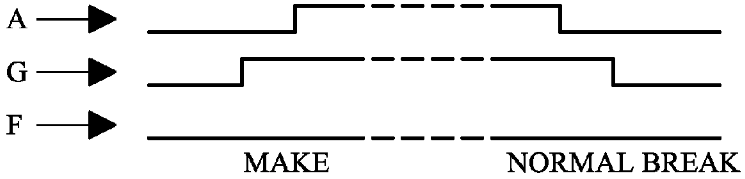

In FIG. 2B the timing of normal "make" and "break" operations of the apparatus is illustrated. Initial conditions are; fuse 31 intact, fuse 32 intact and contacts 21 open. Drive G is applied first and no current flows from source 1 to block 100. After a delay to ensure that contacts 41 have fully closed and stabilized, drive A is applied and a current path is established between source 1 and block 100. The initial conditions for a normal "break" operation are; fuse 31 intact, signal I1=0 and signal I4=0. To perform a "break" operation, Drive A is removed first and after a delay to ensure that contacts 11 have fully opened, drive G is removed. The delay between removal of drive A and drive G is to insure that small residual currents not detected by current sensor 91 do not clear low valued fuse 32.

Figure 2C:
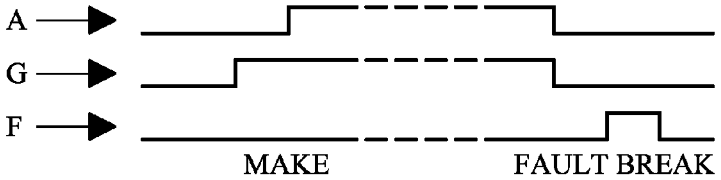

In FIG. 2C the timing of an abnormal "break" operation of the apparatus is illustrated. Initial conditions are; fuse 31 open or signal I1≠0 or signal I4≠0. Drive A and drive G are removed simultaneously and after a delay to ensure that contacts 11 and 41 have fully separated, drive F is pulsed to close contacts 21. If there is sufficient differential fault current an arc will be sustained between contacts 11 and 41, after contacts 11 and 41 open and before contacts 21 close. Typically, this arc duration will be in the order of 20 mS to 60 mS depending on the size of contactor, and will cause significantly less contact erosion with the number of fault cycles intended over the lifetime of the apparatus compared to contacts 11 and 41 breaking rated AC loads in typical, repetitive AC applications. If the fault triggering this abnormal break operation is a ground fault, I4≠0, where the fault current flowing through current sensor 94 is greater than the fuse 32 value, then fuse 32 will clear. If the abnormal break operation was caused by the presence of load current greater than the rating of fuse 31 when a break command was initiated, I1≠0, then fuse 31 will clear. In practice, the rated value of fuse 31 can be orders of magnitude less than the current carrying capacity of contacts 11 and 41. If fuse 31 were not included, the photovoltaic array, source 1, would be damaged from steady-state operation under short circuit conditions.

In FIG. 2A, an automatic, nighttime reset of contactor 20 can be accomplished by initiating a reset pulse, via drive R, to open contacts 21 conditionally when current through current sensor 93 is zero or is within the load break rating of contacts 21.

FIG. 2A illustrates a photovoltaic array configuration with a negative grounded array. The same method can be applied to a positive grounded array. In addition, if fuse 32, contacts 42 and current sensor 94 were removed from the circuit, this embodiment of the invention could be used with a floating or ungrounded photovoltaic array.

Figure 3:
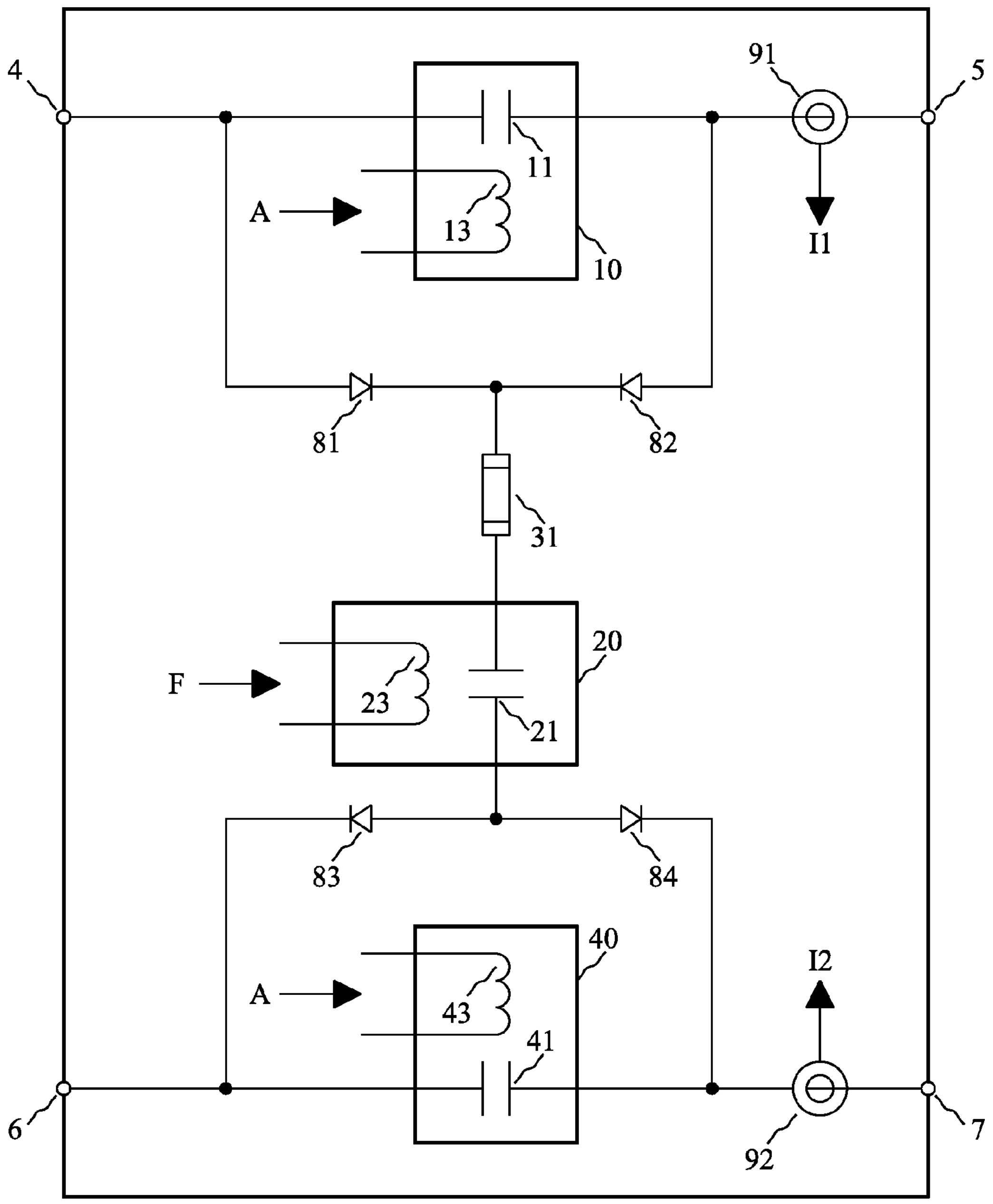
FIG. 3 is a diagram illustrating a power circuit topology based on the invention that is suitable for both AC and DC applications.

FIG. 3 shows an alternate power circuit topology for the invention which can be used to break bi-directional DC currents or AC currents. The circuit shown is a symmetric two port apparatus with a first port between terminals 4 and 6 a second port between terminals 5 and 7. Fault current can be interrupted in either direction, the first port sourcing or sinking current and the second port sinking or sourcing current, respectively. Electromechanical contactors 10 and 40 with normally open contacts 11 and 41 and with actuator coils 13 and 43, respectively, have limited current interrupt capability. Contactor coils 13 and 43 are both controlled by drive signal A. Current sensors 91 and 92 produce outputs I1 and I2 proportional to the current flowing between terminals 4 and 5 and terminals 6 and 7, respectively. Contactor 20 has normally open contacts 21 and actuator coil 23 powered by drive F. Diodes 81, 82, 83 and 84 form a full bridge rectifier circuit to provide the bi-directional interrupt capability of this device.

In FIG. 3 a "break" operation occurs when drive A is removed. Before contacts 11 and 41 separate, the current sensors 91 and 92 are read and compared to a reference value. If either signal I1 or I2 correspond to a current less than the load break capability of contacts 11 and 41, the break operation is complete. If either signal I1 or I2 correspond to a current greater than the load break capability of contacts 11 and 41, a fault condition is indicated and after a sub-second delay (to assure contacts 11 and 41 have fully separated), drive F is applied to close contacts 21 to clear fuse 31. Contactor 20 could also be a semiconductor device, gated on with drive F, with a higher short circuit energy capability than the energy required to clear fuse 31. This configuration could find application in medium voltage AC switchgear and in DC applications where either port is capable of sourcing current.

Figure 4A:
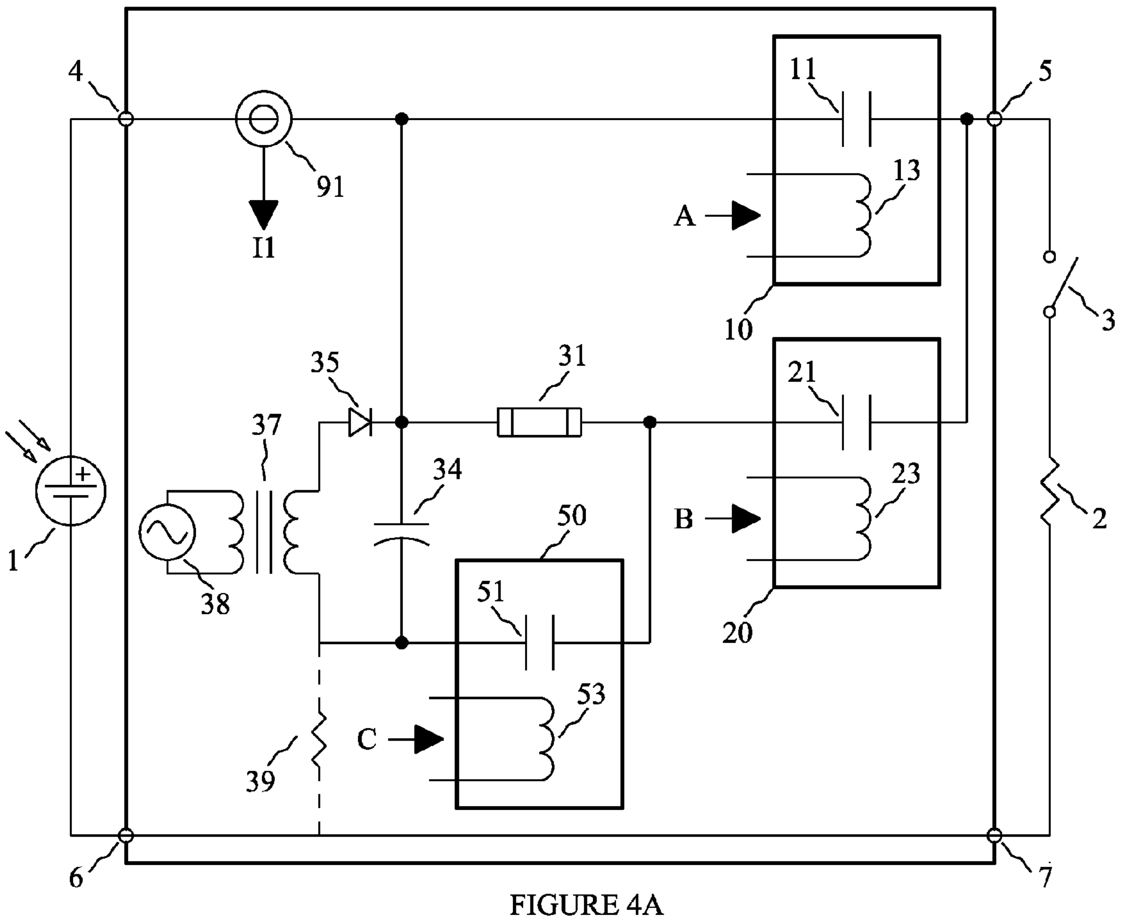
FIG. 4 is a schematic diagram illustrating an embellishment of the invention where stored energy is used to intentionally clear a (the) sacrificial fuse.
Figure 5:
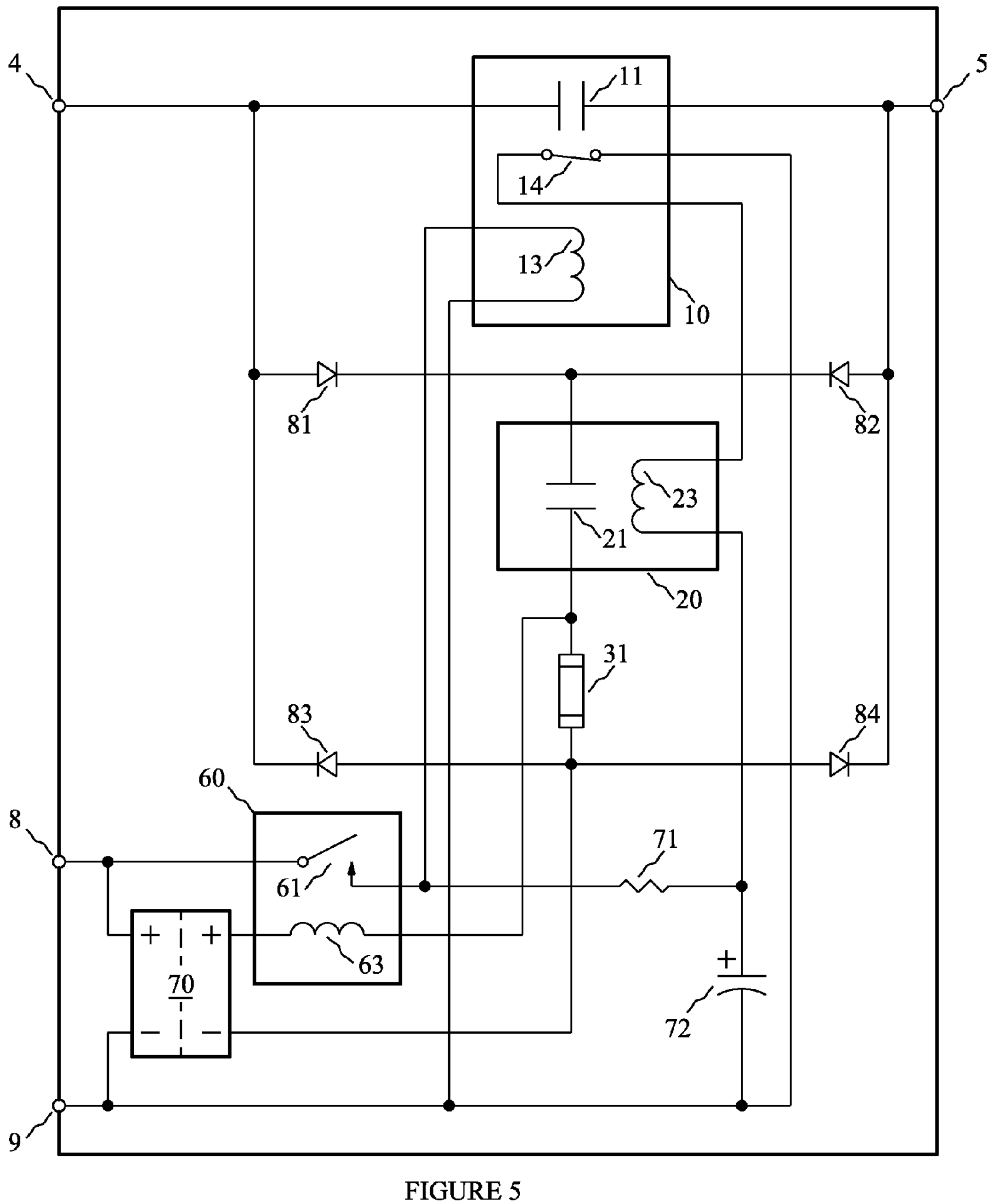
FIG. 5 is a schematic diagram for a functional preferred embodiment of the invention as a "black box" single pole contactor with a single DC control input.

FIG. 4A illustrates an embellishment of the basic invention where AC source 38 is coupled through isolation transformer 37 and rectified by diode 35 to charge energy storage capacitor 34. Electromechanical contactor 50 has normally open contacts 51 and coil 53 powered by drive C. Under fault conditions, drive A is removed, signal I1 indicates overload current and after a delay drive B is asserted. If signal I1≠0 or if a blown fuse 31 detector circuit (not shown) indicates that fuse 31 is intact, the drive C is applied to close contacts 51 and dump the energy stored in capacitor 34 into fuse 31 to clear the fuse. This topology removes the requirement for load break capability of contactor 50 and/or provides a redundancy function to provide safe operation under a number of single-component-failure scenarios. In some applications resistor 39 can replace components 35, 37 and 38 where capacitor 34 is charged through resistor 39 by source 1.

Figure 4B:
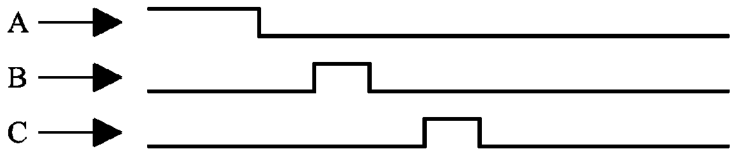

FIG. 4B illustrates the timing of drive signals A, B and C when a break operation is performed under fault conditions.

Figure 4C:
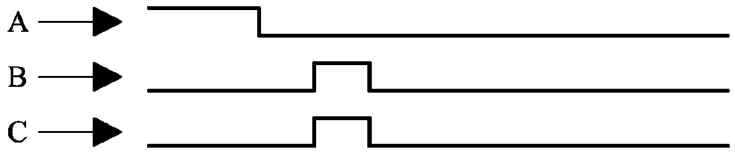

FIG. 4C illustrates and alternate timing method where drives B and C are applied simultaneously so that fuse 31 is cleared by the sum of the fault current and the current sourced from capacitor 34.

FIG. 5 illustrates a preferred embodiment of the invention. From a "black box" perspective, the circuit shown functions as a single-pole normally open electromechanical contactor with power terminals 4 and 5 and with DC coil terminals 8 and 9. This composite contactor has current "make" capability but no "break" capability under normal operating conditions. It is assumed then on some system level (not shown) that removal of drive from "coil" terminals 8 and 9 is externally locked out when current is flowing through contacts 11. A typical application might use this composite contactor between a source and an electronically controlled load, such as a motor drive, a UPS or a renewable energy inverter, where under normal conditions, a top level system controller sets the load command to zero before commanding the composite contactor to open. Under fault conditions where the load cannot be turned off, the composite contactor can perform a single load break operation, a capability that is renewable by replacement of a single fuse.

In FIG. 5, products based on this invention will most likely have a number of current, voltage, temperature and arc sensors as well as interlock switch statuses, external switches, fuse statuses and other signals which provide inputs to a smart controller. Contactor coil drive logic signals will be supplied by the smart controller in response all inputs as directed by the controller software. The smart controller will may also have digital communication capabilities to interface the product with a higher level system controller. FIG. 5 illustrates a "dumb" version of the preferred embodiment that illustrates the basic function of the invention.

In FIG. 5, electromechanical contactor 10 has normally open contacts 11, DC control coil 13 and normally closed auxiliary switch 14. Switch 14 is closed when contacts 11 are open. Electromechanical contactor 20 has normally open contacts 21 and DC control coil 23. Electromechanical relay 30 has normally open contacts 61 and DC control coil 63. To close contacts 11, a DC voltage is applied to control terminals 8 and 9, positive to terminal 8, negative to 9. DC-to-DC converter 70 converters the voltage across control terminals 8 and 9 to an isolated DC voltage and powers control coil 63 if fuse 31 is intact. If fuse 31 is open, the close or make sequence is disallowed and no further actions are taken. If fuse 31 is intact, contacts 61 close, coil 13 is powered, contacts 11 close and auxiliary switch 14 opens. Also, when contacts 61 close, energy storage capacitor 72 begins to charge through resistor 71. The resistor 71 and capacitor 72 time constant is set so that capacitor 72 is not charged to a high enough voltage to allow coil 23 to pull-in contacts 21 during the sub-second delay time before contacts 11 and auxiliary switch 14 transition form the open to closed and closed to open states respectively. This is the end of a close or "make" sequence for the "black box" contactor.

In FIG. 5, to perform an open or "break" operation the initial conditions are; contacts 11 and 61 are closed, switch 14 and contacts 21 are open and fuse 31 is intact. Upon loss of control voltage across terminals 8 and 9, the output of DC-to-DC converter 70 quickly goes to zero, coil 63 is deenergized and contacts 61 open. In turn, coil 13 is deenergized and contacts 11 begin to separate. After a sub-second delay, contacts 11 are fully open and auxiliary switch 14 closes. Closure of auxiliary switch 14 cause coil 20 to become energized with the energy stored in capacitor 72 and contacts 21 are closed and remain closed until capacitor 72 discharges below the "hold" voltage of contactor 20. There are to "break" operation scenarios, normal and fault conditions. Under normal conditions, no current was flowing through contacts 11 just prior to separating so no current flows through contacts 21 and fuse 31 as capacitor 72 discharges and the normal break sequence is complete. Under abnormal conditions, where high DC currents are flowing through contacts 11 at the time of separation, a arc will be formed between contacts 11. When contacts 21 close, the arc current is redirected through diodes 81-84, contacts 21 and fuse 31. The arc energy will then clear fuse 31 and thereafter contacts 21 will open, completing the abnormal break sequence. Fuse 31 "steals" all of the arc current because there must be a voltage potential across contacts 21 to sustain the arc and the alternate path through fuse 31 provides a lower impedance. With fuse 31 open, further closure of contactor 11 and 20 and relay 60 are locked out until fuse 31 is replaced.

The invention leverages the superior cost effective fault clearing capability of fuses in DC and medium voltage AC applications compared to electrical contacts in ambient air and the ability of low voltage AC rated contacts to withstand contact arcing for infrequent, sub-second periods.

The invention enables applications to be served in a cost effective manner where load break capability of contacts is infrequently required. Prior art solutions use hermetically sealed vacuum contacts, arc shoots, magnetic blowouts, hybrid semiconductor assisted switching, multiple series contact sets and other brute force over-design methods to handle infrequent, worst case fault conditions at the expense of wasting this capability under normal operating conditions.

The disclosure in this section primarily deals with electromechanical contactors as the primary sub-component. The invention can be equally applied to any set of electrical contacts where it is desirable to control the arcing between contacts. Other applications may include but are not limited to circuit breakers and disconnect switches for both DC and AC applications.

What I claim as my invention is:

1. An electrical switching apparatus for connecting or disconnecting a DC source from a load comprising: a first input terminal, a second input terminal, a first output terminal, a second output terminal, a fuse, a fuse disposition switch that is open when said fuse is open and is closed when said fuse is intact, a first contactor and a second contactor wherein each said contactor comprises; (a) a pair of normally open electrical contacts, (b) a first and a second terminal, each connected to a unique contact of said pair of normally open electrical contacts, and (c) a control coil that closes said pair of normally open electrical contacts when powered and wherein a circuit is formed with: (i) a unique common coupling of the first input terminal, the first terminal of the first contactor and a first fuse terminal, (ii) a unique common coupling of the second terminal of the first contactor, the first output terminal and the second terminal of the second contactor, (iii) a unique common coupling of a second fuse terminal and the first terminal of the second contactor, (iv) a unique common coupling of the second input terminal and the second output terminal, (v) a drive circuit "A" consisting of a series connected circuit of said fuse disposition switch and the control coil of said first contactor and (vi) a drive circuit "B" consisting of the control coil of said second contactor.

2. The electrical switching apparatus for connecting or disconnecting a DC source from a load according to claim 1 further comprising an energy storage capacitor and a third contactor, wherein the third contactor comprises (a) a pair of normally open electrical contacts, (b) a first and a second terminal, each connected to a unique contact of said pair of normally open electrical contacts, and (c) a control coil that closes said pair of normally open electrical contacts when powered and wherein a circuit is formed with (i) a unique common coupling of said first fuse terminal and a first terminal of the energy storage capacitor, (ii) a unique common coupling of a second terminal of the energy storage capacitor and the first terminal of the third contactor, (iii) a unique common coupling of the second terminal of the third contactor, said second fuse terminal and the first terminal of the second contactor and (iv) a drive circuit "C" consisting of the control coil of said third contactor.

* * * * *